United States Patent [19]
Lin

[11] Patent Number: 6,125,016
[45] Date of Patent: *Sep. 26, 2000

[54] DISK DRIVE INCLUDING EMBEDDED VOICE COIL MAGNET PLATES

[75] Inventor: Joseph Lin, Cupertino, Calif.

[73] Assignee: Seagate Technology LLC, Scotts Valley, Calif.

[*] Notice: Under 35 U.S.C. 154(b), the term of this patent shall be extended for 971 days.

[21] Appl. No.: 08/615,461

[22] Filed: Mar. 14, 1996

Related U.S. Application Data

[63] Continuation of application No. 08/284,368, Aug. 2, 1994, abandoned.

[51] Int. Cl.$^7$ .............................. G11B 5/54; G11B 21/12; B22D 19/04
[52] U.S. Cl. .................................... 360/264.8; 360/264.9; 164/98
[58] Field of Search ................ 360/99.08, 99.07, 360/105, 106; 164/98, 108

[56] References Cited

U.S. PATENT DOCUMENTS

| | | | |
|---|---|---|---|
| 4,505,238 | 3/1985 | Jordan | 164/108 |
| 4,661,735 | 4/1987 | Miki et al. | 310/112 |
| 5,193,037 | 3/1993 | Pace | 360/106 |
| 5,315,464 | 5/1994 | Tsujino | 360/99.08 |
| 5,315,466 | 5/1994 | Nishimoto et al. | 360/106 |

FOREIGN PATENT DOCUMENTS

| | | |
|---|---|---|
| 0 427 490 A2 | 11/1990 | European Pat. Off. . |
| 0 550 978 A1 | 12/1992 | European Pat. Off. . |
| 1007382 | 1/1989 | Japan . |

*Primary Examiner*—David L. Ometz
*Attorney, Agent, or Firm*—Shawn B. Dempster; Edward P. Heller III; Jonathan E. Olson

[57] ABSTRACT

A disk drive including voice coil magnet plates formed integrally with the base and/or cover of the disk drive. During the fabrication process, the steel magnet plates are placed in proper position in the base and cover die casting, and then the molten aluminum is injected to form the base and cover. As result, the magnet plates are integral with the base and cover and no fluid leakage can occur around the boundary between the top magnet and cover, or around the boundary between the bottom magnet and base. Thus, the disk drive is sealed against the external environment.

4 Claims, 5 Drawing Sheets

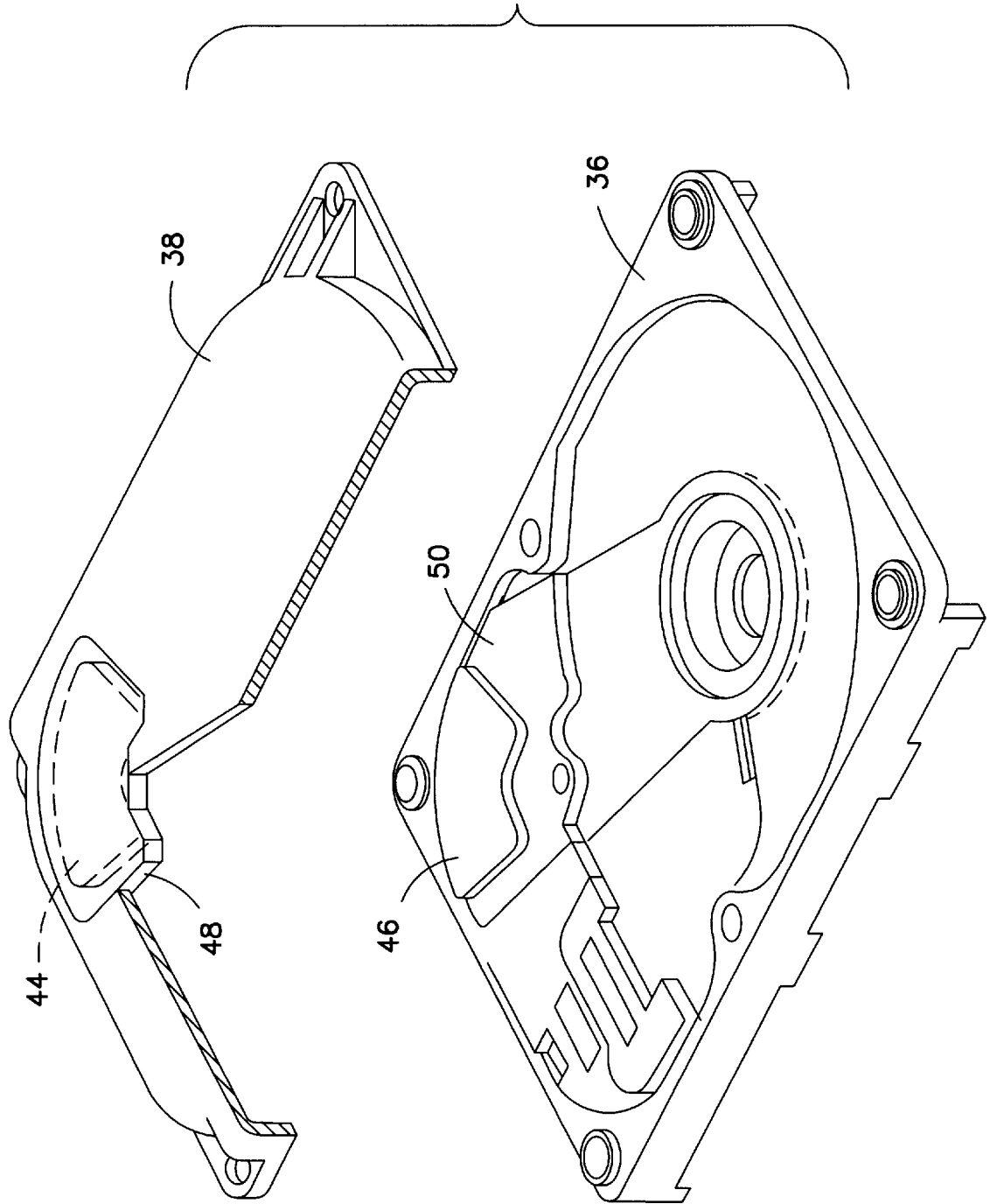

DISK DRIVE INCLUDING EMBEDDED VOICE COIL MAGNET PLATES

"This application is a continuation of Ser. No. 08/284,368, filed Aug. 2, 1994, now abandoned,"

BACKGROUND OF THE INVENTION

1. Field of the Invention

The present invention relates to a data storage device, and more particularly, to a disk drive including voice coil motor magnet plates formed integrally with the base and/or cover of the disk drive during the drive fabrication process.

2. Description of the Related Art

In general, Winchester-type disk drives operate by transferring data between read/write transducing heads and respective data tracks on magnetic storage disks. The transducing heads are supported by an actuator assembly, which is provided to pivot the heads across the surfaces of the disks. Pivoting of the actuator assembly and transducing heads is generally accomplished by a voice coil motor ("VCM") provided as part of the actuator assembly at an end of the actuator assembly opposite the transducing heads.

A VCM is typically comprised of a permanent magnet stationarily mounted within the drive, and electrical windings fixedly mounted to the actuator assembly, adjacent to the magnet, so as to pivot with the actuator assembly. The windings are located within a magnetic field set up by the magnet, and, upon introduction of an electric current through the windings, the magnetic field will exert a force on the windings causing the actuator assembly and transducing heads to pivot. The VCM is coupled to control electronics, which control the current through the windings, and thus control the positioning of the actuator assembly and transducing heads with respect to the storage disk.

The time it takes to pivot the actuator assembly so as to move the transducing heads between different data tracks on the storage disk in response to control signals is referred to as the drive seek time. With past improvements to disk drive microprocessors, the seek time of a disk drive has become the major factor limiting the rate at which data is transferred between the heads and disks. As such, there has been an industry wide effort to minimize seek time. Seek time is primarily dependent on the torque which can be generated in the VCM to pivot the actuator assembly between data tracks on the disk. Several factors effect the maximum VCM torque, including the strength of the magnetic field, the moment of inertia of the actuator assembly, and the inductance of the electrical windings. In the case of inductance, a high inductance within the windings of the VCM will result in a high resistance to a change in the current within windings. As a quick change in current is necessary for fast seek times, a high inductance within the windings will result in slower seek times.

Conventionally, the voice coil magnet assembly also include magnetically permeable plates adjacent to the magnet, which plates are fixedly mounted within the drive housing. Conventional magnet assemblies have further included magnetically permeable return posts extending between the top and bottom magnet plates. The magnet plates and the return posts together provide a closed magnetic field loop for the magnetic flux lines emanating from the permanent magnet. This configuration was provided to maximize the magnetic field in the vicinity of the actuator's windings. The magnetic field in this region contributes most directly to the strength of the torque generated by the VCM.

The provision of return posts within the VCM creates certain disadvantages, but the posts have heretofore been necessary in order to provide the requisite magnetic field intensity. One such disadvantage is that the presence of the return posts within the VCM increases the inductance within the windings. As previously stated, increased inductance results in slower seek times. Another disadvantage presented by the return posts is that the posts are manufactured with engineering tolerances and no two posts are of exactly the same construction. Posts of even slightly different sizes and/or constructions will vary the magnetic field travelling through the closed loop. Thus, the magnetic field between the magnets, and consequently the torque created by the VCM, will vary in different disk drives. Further still, providing side posts adds to the complexity and cost of manufacturing the disk drive.

SUMMARY OF THE INVENTION

It is therefore an object of the present invention to provide a VCM magnet assembly for use in a disk drive, wherein the top and bottom magnet plates are formed integrally as part of the cover and base, respectively, of the disk drive.

It is a further object of the present invention to provide the top and bottom magnet plates within the cover and base, respectively, without having any fluid leakage around the boundary between the magnets and the cover and base, thereby ensuring a sealed environment for the head and disk assembly.

It is a still further object of the present invention to provide a VCM magnet assembly for use in a disk drive providing a large magnetic field without the use of magnet return posts between the top and bottom magnet plates.

These and other objects are accomplished by. the present invention which relates to a disk. drive including VCM magnet plates formed integrally with the base and/or cover of the disk drive. During the fabrication process, the steel magnet plates are placed in proper position in the base and cover die casting, and then the molten aluminum is injected to form the base and cover. As result, the magnet plates are integral with the base and cover and no fluid leakage can occur around the boundary between the top magnet and cover, or around the boundary between the bottom magnet and base. Thus, the disk drive is sealed against the external environment. The plates may be formed with a plurality of grooves, into which the molten aluminum flows during the fabrication process, to thereby ensure that the plates will remain fixedly secured to the base and cover, respectively.

Forming the magnet plates integrally with the base and/or cover allows omission the magnet side posts, normally required to provide a closed magnetic field loop. Providing a VCM magnet assembly without return posts offers several advantages, including faster seek times, a more simple and less expensive VCM design, and greater control over the magnetic field intensity. The decrease in the magnetic field due to the absence of the side post return paths is compensated for by having thicker magnet plates and magnets. The increased thickness of the plates and magnets is allowed by forming the plates in the base and cover, as opposed to adjacent to the base and cover.

In a further embodiment of the present invention, the top and/or bottom magnet plate may be extended to the area surrounding the spindle motor such that the actuator and spindle motor are both mounted to the top and/or bottom magnet plates. Such a design reduces the relative movement that may otherwise occur as result of uneven thermal expansion between the read/write heads mounted on the actuator and the disks supported on the spindle motor.

BRIEF DESCRIPTION OF THE DRAWINGS

The invention will now be explained with reference to the Figures in which:

FIG. 5 is an alternative embodiment of a disk drive according to the present invention.

DESCRIPTION OF BEST MODE

The invention will now be described with reference to FIGS. 1–5, which relate in general to a disk drive including voice coil magnet plates formed integrally with the base and/or cover of the disk drive during the drive fabrication process. It is understood that the present invention may operate with disk drives of various designs and sizes.

Figure 1:
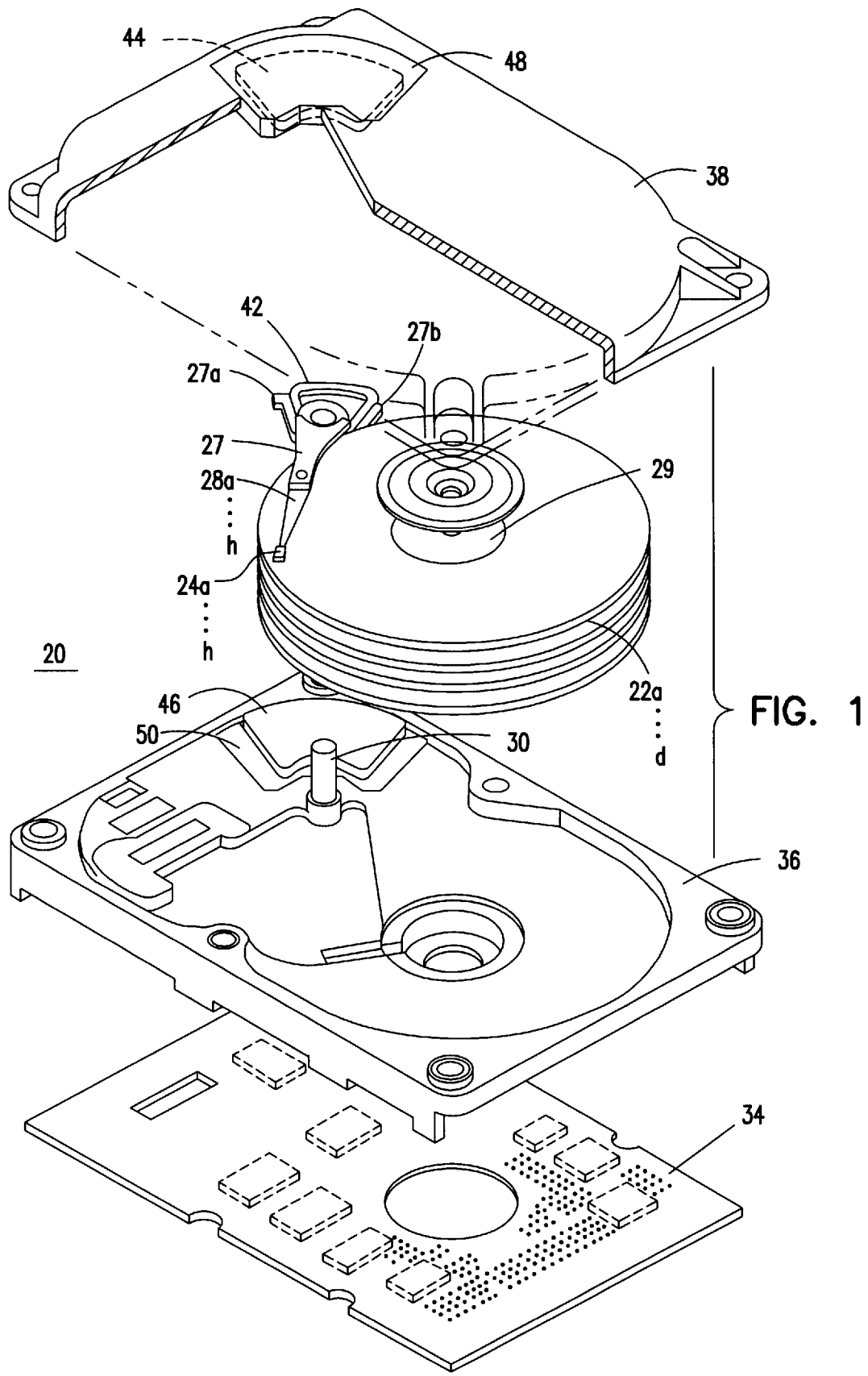
FIG. 1 is an exploded perspective view a disk drive according to the present invention.
Figure 2:
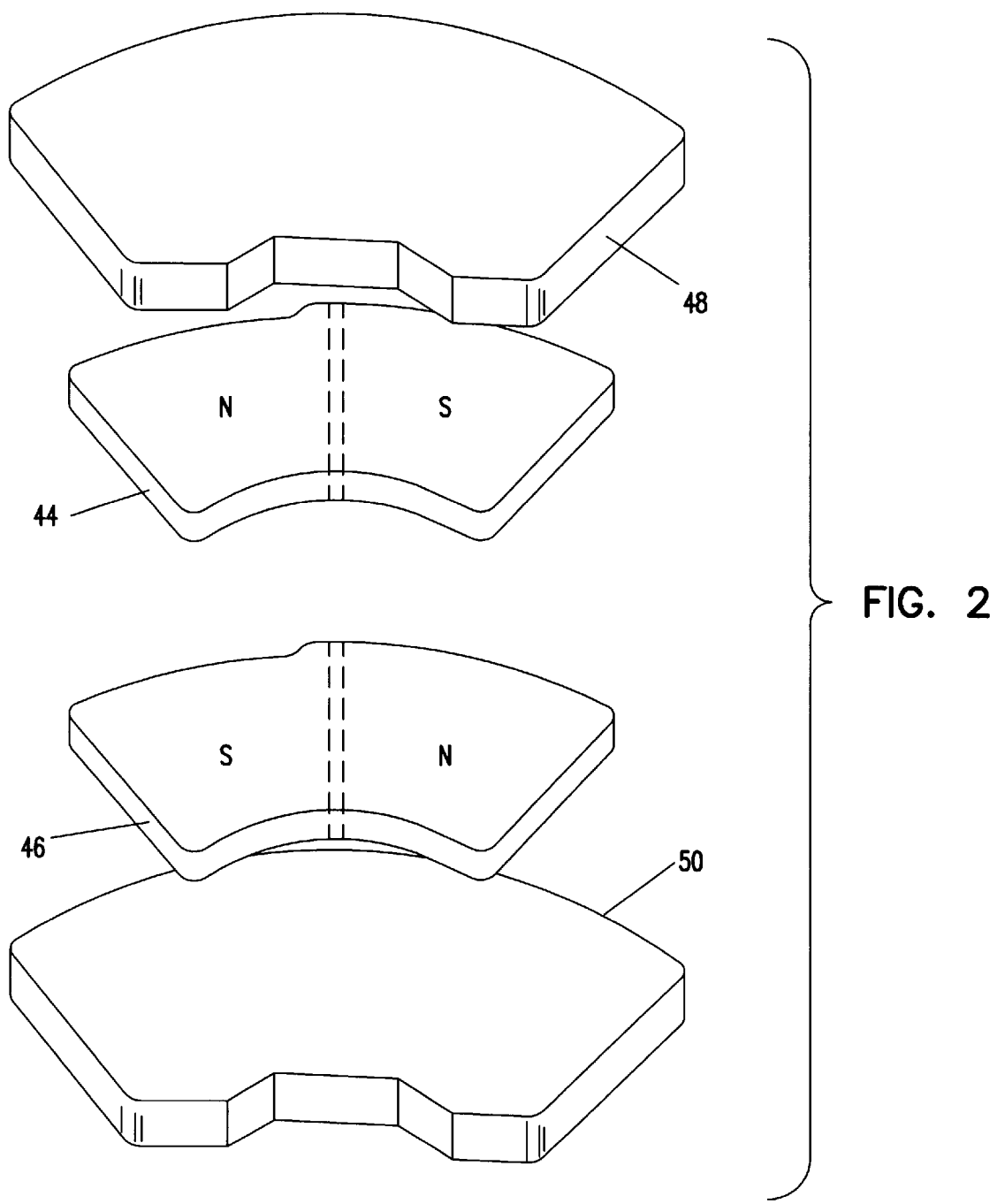
FIG. 2 is an exploded perspective view of the embedded voice coil magnet assembly according to the present invention.
Figure 3:
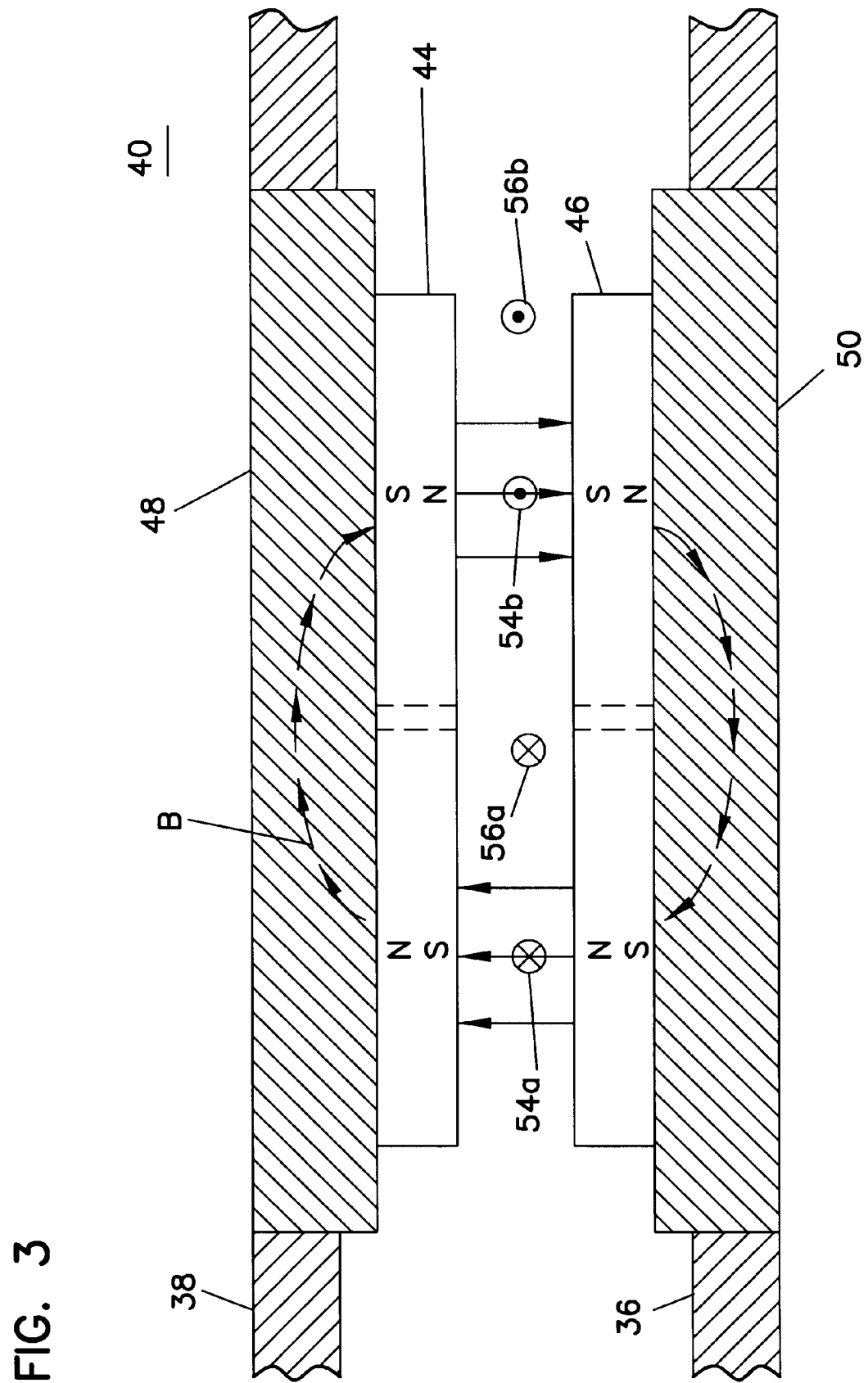
FIG. 3 is a cross sectional view of the voice coil magnet assembly according to the present invention.

Referring now to FIG. 1, there is shown a disk drive 20 including a plurality of storage disks $22_{a-d}$ and a plurality of read/write heads $24_{a-h}$. One head 24 is provided for each of the eight surfaces of disks $22_{a-d}$. It is understood that the disk drive 20 may include more or less than the above-disclosed numbers of disks and heads. Each read/write head 24 is comprised of a transducer mounted to a slider. The slider of each head $24_{a-h}$ is in turn supported on actuator arms $28_{a-h}$. The transducer may be a conventional inductive transducing element, or in an alternative embodiment, may be a magneto-resistive (MR) transducing element. The drive 20 further includes an actuator assembly 27 having actuator arms $28_{a-h}$. Actuator assembly 27 is provided to pivot around pin 30 by a voice coil motor ("VCM") described hereinafter. As is known in the art, during operation of the drive 20, disks $22_{a-d}$ are rotated by a spindle motor 29 and actuator arms $28_{a-h}$ pivot read/write head $24_{a-h}$ across the surface of the disks so that data is transferred between the read/write heads $24_{a-h}$ and the disks $22_{a-d}$ in a plurality of concentric data tracks. The drive 20 further includes a printed circuit board (PCB) 34 having the data transfer and control electronics for the drive.

The head and disk assembly ("HDA") is preferably enclosed within a base 36 and a cover 38, which fit together to form a sealed environment for the HDA. The PCB is preferably located on an underside of the base 36. In a preferred embodiment, the base and cover are formed from aluminum.

As shown in FIGS. 1–4B, the VCM includes magnet assembly 40 and conductive windings 42. Windings 42 are fixedly mounted between actuator assembly sub-arms 27a and 27b, and are provided to receive an electric current from PCB 34. Magnet assembly 40 includes top and bottom magnets 44 and 46, respectively, which magnets are spaced apart from each other such that windings 42 may be located therebetween. In a preferred embodiment, magnets 44 and 46 may be comprised of a conventional permanent magnetic material, such as a neodymium-iron-boron alloy or comparable material. Both magnets include top and bottom surfaces substantially parallel to a plane in which the actuator assembly pivots. Magnet 44 may have a direction of magnetization substantially perpendicular to the top and bottom surfaces, and may be magnetized such that one-half of the magnet has a top-to-bottom north-south magnetization, and the other half has a top-to-bottom south-north magnetization. Magnet 46 is preferably provided with the same magnetic orientation. Thus, when provided as shown-in FIG. 3, a magnetic field "B" is set up with flux lines flowing from a north pole of bottom magnet 46 to a south pole of top magnet 44, and from a north pole of top magnet 44 to a south pole of bottom magnet 46.

As is well known in the art, in the presence of a current through windings 42 located within the magnetic field B, the magnetic field B will exert a force on the windings perpendicular to the direction of the flux lines. As previously described, the windings 42 are fixedly mounted to the actuator assembly 27, and the force exerted by the field B causes actuator assembly 27, as well as heads $24_{a-h}$ attached thereto, to pivot across the surface of the disks $22_{a-d}$. The duration and direction of the current through windings 42 is controlled by PCB 34, so as to accurately position the heads $24_{a-h}$ over the desired data track on the respective storage disks $22_{a-h}$.

As further shown in FIGS. 1–4B, the present invention further includes an upper magnet plate 48 to which top magnet 44 is secured, and lower magnet plate 50 to which bottom magnet 46 is secured. Upper and lower magnet plates 48 and 50 are formed of a magnetically permeable material, such as low carbon steel for example, and function to transmit the flux lines within both magnets from one-half of each magnet (i.e., the north side) to the other half of each magnet (i.e., the south side), and through the air gap between the upper and lower magnets.

As described in the Background of the Invention section, conventional magnet plates are affixed adjacent to the surfaces of the cover and base. However, according to the present invention, the magnet plates 48 and 50 are formed within and as part of the cover and base, respectively. During the fabrication process, the preformed magnet plates are positioned within the die castings used to form the base and cover. Once the magnet plates are properly positioned, the molten aluminum is injected into the die castings, and forms around the magnet plates. As a result, the upper and lower magnet plates are formed as part of and integrally with the cover and base, respectively, and there are no gaps at the boundary between the magnet plates and the cover and base for fluid to escape. Consequently, a sealed environment for the HDA may be maintained.

Figure 4A:
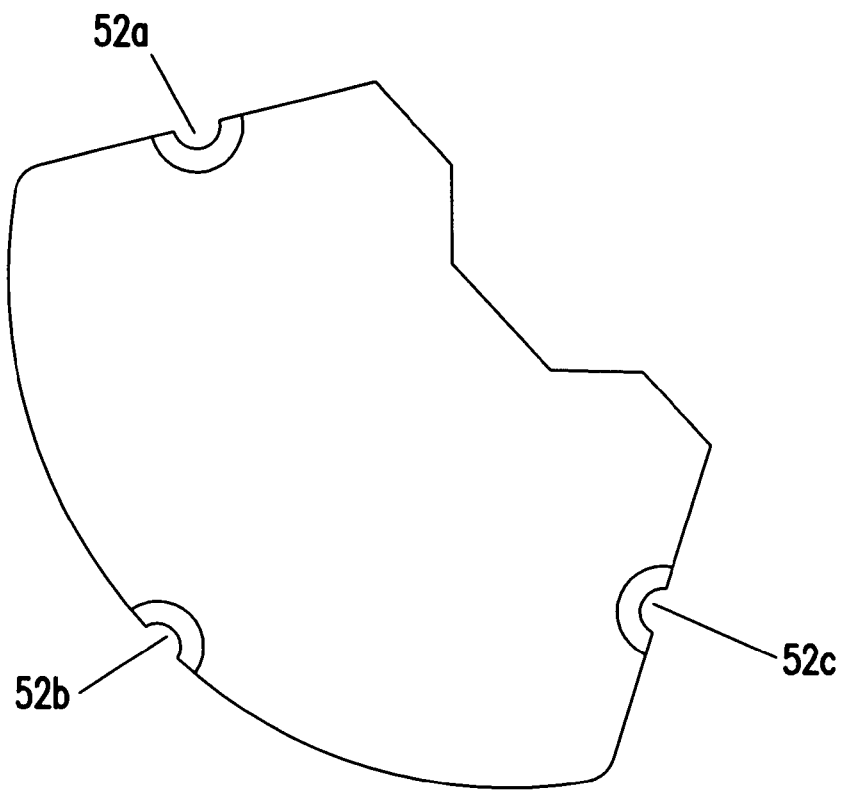
FIG. 4A is a top view of a magnet plat according to the present invention including notches.
Figure 4B:
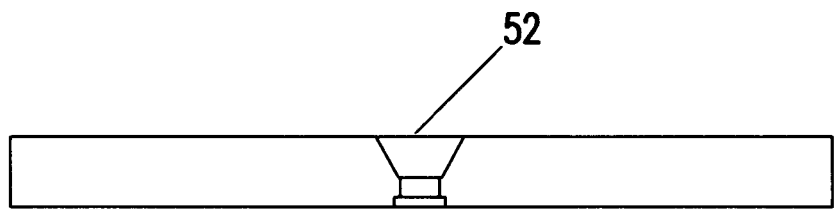
FIG. 4B is a side view of the embodiment shown in FIG. 4A.

As shown in on FIGS. 4a and 4b, in a preferred embodiment of the present invention, upper and lower magnet plates may be formed with notches 52a, 52b and 52c. When the molten aluminum is injected into the die during the base and cover fabrication, the aluminum flows into the notches 52a–a. As result, after the aluminum hardens, the notches firmly secure the upper and lower magnet plates to the cover and base, respectively. It is understood that the upper and lower magnet plates may be formed with other notch configurations, or with other geometries which will serve to interlock and secure the plates to the cover and base.

Forming the upper and lower magnet plates 48 and 50 within cover 38 and base 36, respectively, offers the advantage that both the magnet plates 48 and 50 and magnets 44 and 46 may be of a greater thickness as compared to magnet plates and magnets within conventional disk drives of the same size. In, for example, a 3½ inch form factor disk drive having a total height (not including the PCB 34) of approximately 0.665 inches, the thicknesses of the upper and lower magnet plates and top and bottom magnets in a preferred embodiment are as follows:

upper magnet plate: 0.1925 inches
lower magnet plate: 0.1925 inches
top magnet: 0.090 inches
bottom magnet: 0.090 inches.

These dimensions allow an air gap between the top and bottom magnets of preferably 0.10 inches. It is understood that the magnet plates and magnets may have different thicknesses in alternative embodiments, and may have different thicknesses for drives having form factors larger or smaller than 3½ inches. The magnet plates are of a sufficient thickness to prevent the magnetic field from the magnets from passing completely through the plates and creating noise which may otherwise interfere with the PCB 34 or other surrounding electrical components. Thus, for example, when a powerful magnetic material is used for top and bottom magnets, thicker magnet plates are required to prevent the magnetic flux lines from passing through the base and/or cover.

The increased thicknesses of the magnets and magnet plates in the VCM allow for an increased magnetic field B in the gap between the top and bottom magnets 44 and 46. In a preferred embodiment of the present invention, without return posts and with an air gap between the top and bottom magnets of approximately 0.10 inches, the magnetic field within the gap has been experimentally determined to be 7976 Gauss. By comparison, in a conventional VCM having return posts and a similar air gap, and having magnet and plate thicknesses of 0.78 inches and 0.118 inches, respectively, the magnetic field within the gap has been experimentally determined to be approximately 7565 Gauss. Therefore, even without return posts, the present invention offers an increase in the magnetic field across the gap of approximately 411 Gauss.

Omitting the return posts utilized in conventional VCM magnet assemblies offers several advantages. First, the absence of return posts lowers the inductance within windings 42, thereby increasing the rate at which the current may change through windings 42. A quicker rate of current change provides quicker seek times. Moreover, the absence of return posts allows better control and greater uniformity of the magnetic field properties. One reason is that the intensity of a magnetic field in conventional voice coil motors is highly dependent. on the height of the return posts. However, due to manufacturing tolerances, the height of the return posts vary from one voice coil to the next, and therefore, the intensity of the magnetic field varies from one drive to the next. By omitting the return posts, the intensity of the magnetic field from one voice coil to the next remains relatively uniform.

Moreover, within a particular voice coil of conventional design, the presence of return posts cause a variation, or a non-linear profile of the magnetic field intensity. For example, in a voice coil viewed from the perspective shown in FIG. 3, a cross-section of the windings at two different positions of the actuator are shown. Points 54*a* and 54*b* represent a first position of the windings where they are at the horizontal center of the magnet assembly 40. Points 56*a* and 56*b* represent a second position of the windings where they are at a side of magnet assembly 40. The second case corresponds to the situation where the heads $24_{a-h}$ are positioned at the inner or outer diameter of the disks $22_{a-d}$.

In a conventional magnet assembly, the torque generated by the windings at the first position shown by points 54*a* and 54*b* will be higher than the torque generated by the windings at the second position shown by points 56*a* and 56*b*. On the other hand, in a magnet assembly according to the present invention, without return posts, the difference in the torque generated by the windings from the first position to the second position is greatly reduced. Thus, as a direct result of omitting the return posts, the intensity of the magnetic field across the length of the gap is more uniform and linear. This provides a relatively uniform movement of the windings through the gap, and in turn, greater uniformity of and control over the movement of the heads $24_{a-h}$ over the surface of the storage disks $22_{a-d}$.

The present invention provides a further advantage in that the omission of return posts allows for a simpler design with less parts and which is less expensive to manufacture.

In an alternative embodiment of the present invention shown in FIG. 5, the lower magnet plate 50 may be enlarged so that both actuator assembly 27 and the spindle motor 29 are mounted to the base through a pair of mounting screws fitted through holes in the steel magnet plate 50. Thus, it is assured that a change in temperature will not result in a relative movement between either the magnet assembly 40 and windings 42 or the actuator assembly 27 and disks 22 die to thermal expansion. In a further embodiment, to similarly avoid uneven thermal expansion and relative movement between the drive components, the cover may also contain an enlarged magnet plate 48 so that both the actuator assembly 27 and the spindle motor 29 are mounted to the cover through a pair of mounting screws fitted through holes in the steel magnet plate 48.

Although the invention has been described in detail herein, it should be understood that the invention is not limited to the embodiments herein disclosed. Various changes, substitutions and modifications may be made thereto by these skilled in the art without departing from the spirit or scope of the invention as described and defined by the appended claims.

I claim:

1. A method of fabricating a magnet assembly for voice coil motor of a disk drive, comprising the steps of:

locating a first magnet plate within a die casting for a cover of the disk drive;

providing molten material from which said cover is made into said die casting around said first magnet plate;

locating a second magnet plate within a die casting for a base of the disk drive;

providing molten material from which said base is made into said die casting around said second magnet plate;

affixing at least one magnet to said first and/or second magnet plates; and joining said base with said cover to provide a sealed environment for the disk drive.

2. A method of providing a magnet plate for a disk drive, comprising the steps of:

locating a magnet plate within a die casting for at least a portion of a housing of the disk drive; and providing molten material from which said at least a portion of the housing is made into said die casting around said magnet plate.

3. A method of providing a magnet plate for a disk drive as recited in claim 2, further comprising the step of interlocking said magnet plate with said at least a portion of the housing during said step of providing molten material into said die casting.

4. A method of providing a magnet plate for a disk drive, comprising the steps of:

locating a magnet plate within a die casting for at least a portion of a housing of the disk drive;

providing molten material from which said at least a portion of the housing is made into said die casting around said magnet plate; and interlocking said magnet plate with said at least a portion of the housing during said step of providing molten material into said die casting around said magnet plate.

* * * * *